United States Patent [19]

Warrick

[11] Patent Number: 5,097,572
[45] Date of Patent: Mar. 24, 1992

[54] POSITIVE LOCK FOR STRAP CONNECTOR

[75] Inventor: James C. Warrick, Tempe, Ariz.

[73] Assignee: Wickes Manufacturing Company, Southfield, Mich.

[21] Appl. No.: 434,740

[22] Filed: Nov. 13, 1989

[51] Int. Cl.$^5$ .............................................. A44B 11/25
[52] U.S. Cl. ........................................ 24/645; 24/650; 24/647
[58] Field of Search ................... 297/468; 244/151 A, 244/151 B; 24/633, 643, 645, 646, 647, 650

[56] References Cited

U.S. PATENT DOCUMENTS

| | | |
|---|---|---|
| 3,183,568 | 5/1965 | Gaylord. |
| 3,293,715 | 12/1966 | Wisniewski ........................ 24/650 X |
| 3,330,014 | 7/1967 | Gaylord. |
| 3,659,322 | 5/1972 | Gaylord. |
| 3,942,227 | 3/1976 | Phillips et al. ..................... 24/645 X |
| 4,025,992 | 5/1977 | Zindblad ............................... 24/650 |

FOREIGN PATENT DOCUMENTS

WO84/01275  4/1984  PCT Int'l Appl. ................... 24/633

*Primary Examiner*—James R. Brittain
*Attorney, Agent, or Firm*—David A. Greenlee

[57] ABSTRACT

A parachute canopy strap connecting device comprises a male strap connector having a locking tang including a locking notch, a female strap connector having a housing including a slot for receiving the tang for insertion to a locking position, and a locking lever having a handle mounted on the housing and including a lock shoulder movable into and out of the slot as the locking lever is moved between extreme lock and unlock positions. A spring are provided to bias the locking lever to lock position, and a cover lever is mounted on the housing for movement between positions covering and uncovering the locking lever handle. A second spring biases the cover lever to covering position, and a blocking pawl is mounted on the housing for movement between a normal biased position, blocking movement of the locking lever from unlock to lock positions, and an unblocking position forced by engagement of a contact surface by the locking tang, upon its insertion to locking position. This enables movement of the locking lever to locking position to move the lock shoulder into the tang slot to lock the male strap connector to the housing.

6 Claims, 5 Drawing Sheets

POSITIVE LOCK FOR STRAP CONNECTOR

FIELD OF THE INVENTION

This invention relates generally to connecting devices and, more particularly, to a positive lock arrangement for a parachute canopy strap connector.

BACKGROUND OF THE INVENTION

Currently-available parachute canopy strap connectors provide a means of connecting the canopy of an aircrew escape parachute to an aircrewman's torso harness. This allows the aircrewman to don the harness prior to entering the cockpit and later easily connect the harness to the ejection seat-mounted parachute during the strap-in procedure. In practice, two such connectors are used—one for each parachute riser. The connectors allow for rapid manual release when normally exiting the cockpit, and upon landing or water entry after ejection and consequent parachute deployment. A connector of this type is the subject of U.S. Pat. No. 3,183,568 to Gaylord.

In the Gaylord release, a male strap connector is insertable into a female strap connector housing which mounts a pair of pivotable levers. An outer cover lever is retractable to expose an inner actuating lever for operation. The inner actuating lever is coupled to a notched roll bar through a lost motion connection which permits the roll bar to rotate relative to the actuating lever in one direction only. The male connector carries two parallel locking tangs which are inserted into complementary slots in the female connector to engage and rotate the roll bar out of normally blocking position relative to the actuating lever against a spring bias. This enables penetration of the tangs into a locking position wherein notches in the roll bar mate with grooves in the locking tangs without moving the actuating lever. The interengagement of the locking tangs with the roll bar provide a barrier engagement preventing withdrawal of the male connector.

To disengage the connector parts, rotation of the cover lever enables manipulation of the actuating lever to rotate the roll bar in the other direction out of barrier engagement with the locking tangs and free the male connector for disengagement with the female member. This enables release of the parachute from the harness.

The lost motion connection between the actuating lever and the roll bar enables insertion of the male connector into locking engagement with the female connector without moving the actuating lever. Upon insertion, cam surfaces on the locking tangs rotate the roll bar out of blocking position against spring force sufficiently to enable passage of the tangs. This "plug in" feature greatly facilitates crew-in since it simplifies hookup and provides an audible "click" indication that lockup has occurred.

Inadvertent actuation of the actuating lever is prevented, since the cover lever must be consciously operated to enable operation of the actuating lever to release the connector members. The Gaylord release usage of the pair of interacting opposing levers prevents unintended and inadvertent actuation of the release as a result of windblast or snagging on some portion of the aircraft. However, since the lost motion connection permits relative movement of the roll bar and the actuating lever, there is a remote possibility that shock or vibration could conceivably cause such movement and accidental release.

SUMMARY OF THE INVENTION

It is an object of this invention to provide a parachute strap connector that prevents unintended and inadvertent actuation of the release due to windblast, snagging, vibration, or any other cause.

In one aspect, a connecting device according to this invention comprises a male connector having a locking tang including a locking surface and a female connector having a slot for receiving the tang for insertion to locking position. A locking lever including a locking shoulder is pivotally mounted on the female connector for movement between an unlock position and a lock position in which the locking shoulder can engage the locking surface of the tang to prevent removal of the male connector from the female connector. The locking lever is biased to lock position, but is blocked from moving to that position by a blocking pawl that is pivotally mounted on the female connector. The pawl moves between blocking and unblocking positions, and is biased to blocking position upon movement of the locking lever to unlock position and removal of the male connector from the female connector. The locking tang moves the pawl out of blocking position upon tang insertion to enable movement of the locking lever to lock position.

In another aspect, a parachute strap connector according to this invention comprises a male strap connector having a locking tang including a locking notch and a female strap connector having a housing including a slot for receiving the tang for insertion to a locking position. A locking lever having a handle is mounted on the housing and includes a lock shoulder movable into and out of the slot as the locking lever is moved between a biased lock position and an unlock position. A cover lever is mounted on the housing and is biased toward a position covering the locking lever handle and is movable to a position uncovering the locking lever handle. A blocking pawl is mounted on the housing and has a normal biased position blocking movement of the locking lever from unlock to lock positions; it has a contact surface engageable by the locking tang upon its movement to locking position to move the pawl to a position unblocking movement of the locking lever to locking position in which the lock shoulder occupies the tang slot to lock the male strap connector to the housing.

The connecting device further includes a blocking surface on the locking lever which is engaged by the cover lever, upon sequential movement of the cover lever to uncovering position and movement of the locking lever to unlocking position, to prevent movement of the cover lever to covering position. When the pawl is moved to unblock position by insertion of the locking tang to its locking position in the housing, the locking lever is free to move to its locking position which disengages the blocking surface from the cover lever which can then move to its position covering the locking lever handle.

To release the male connector from this position, the cover lever is moved to uncover the locking lever handle, which is grasped to move the locking lever to a position removing the locking shoulder from the tang locking notch, freeing the tang for removal of the male connector. This action allows the pawl to move to its position blocking movement of the locking lever to locking position, which prevents movement of the cover lever to cover position. Since both levers are extended from the housing, this provides a visual signal that the connecting device is released.

To secure the connectors, the male connector is inserted into the housing with the locking tang entering the slot. The nose of the tang engages the rear of the locking shoulder to move the locking lever off the pawl; it then engages the pawl to pivot it out of blocking position. The locking lever is then biased to locking position, camming the cover lever out of its path of travel; the cover lever is then biased to its position covering the locking lever handle.

In this manner, the male connector cannot be removed unless the locking lever is moved to unlocking position, which cannot occur until the cover lever is moved to uncover the locking lever handle. This provides a positive lock for the connecting device without any lost motion connections, and prevents any of the levers from assuming a locked position unless the male connector is actually locked to the female connector.

These and further features and advantages of the invention will become more readily apparent upon reading the following detailed description of the invention as illustrated in the accompanying drawings, in which:

DETAILED DESCRIPTION OF THE INVENTION

Figure 1:
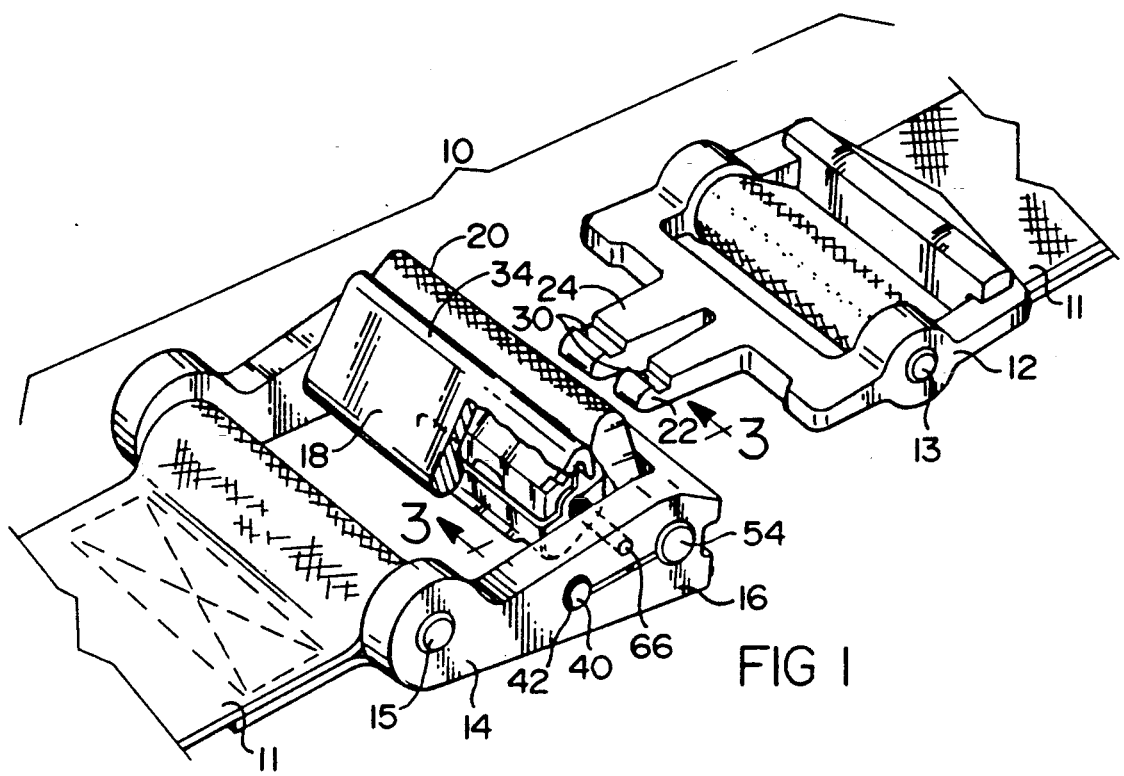
FIG. 1 is a perspective view of a parachute strap connecting device according to this invention, showing the female and male members unlocked.
Figure 2:
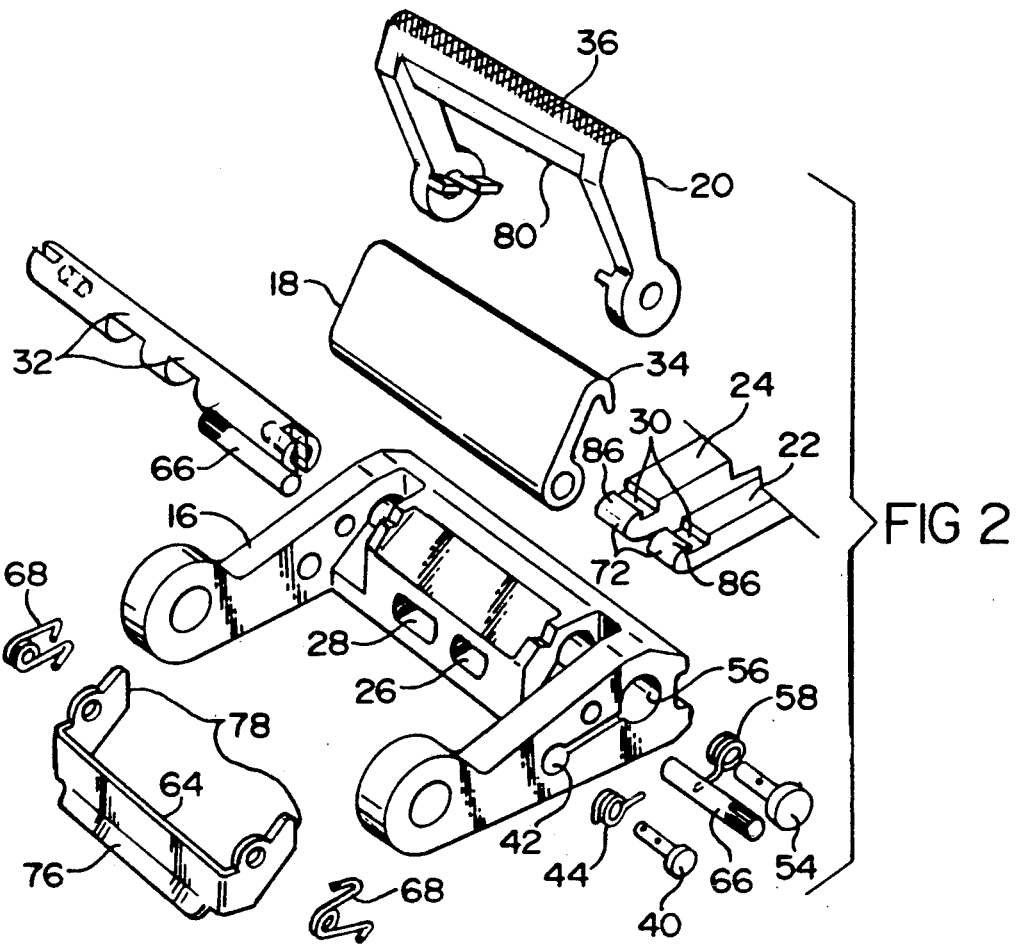
FIG. 2 is an exploded perspective view the female member and a portion of the male member of FIG. 1, showing the details of construction.

Referring now to FIGS. 1 and 2 of the drawings, a parachute strap connecting device 10 according to this invention comprises a male connector 12 which is inserted into a female connector 14. Both connectors are adapted to be connected to parachute harness straps 11 via webbing pins 13 and 15, as is well-known. The female connector comprises a housing 16 to which is pivoted a cover lever 18 and a locking lever 20. Male connector 12 comprises a pair of spaced locking tangs 22, 24 which are inserted into mating slots 26, 28 in housing 16.

Figure 5:
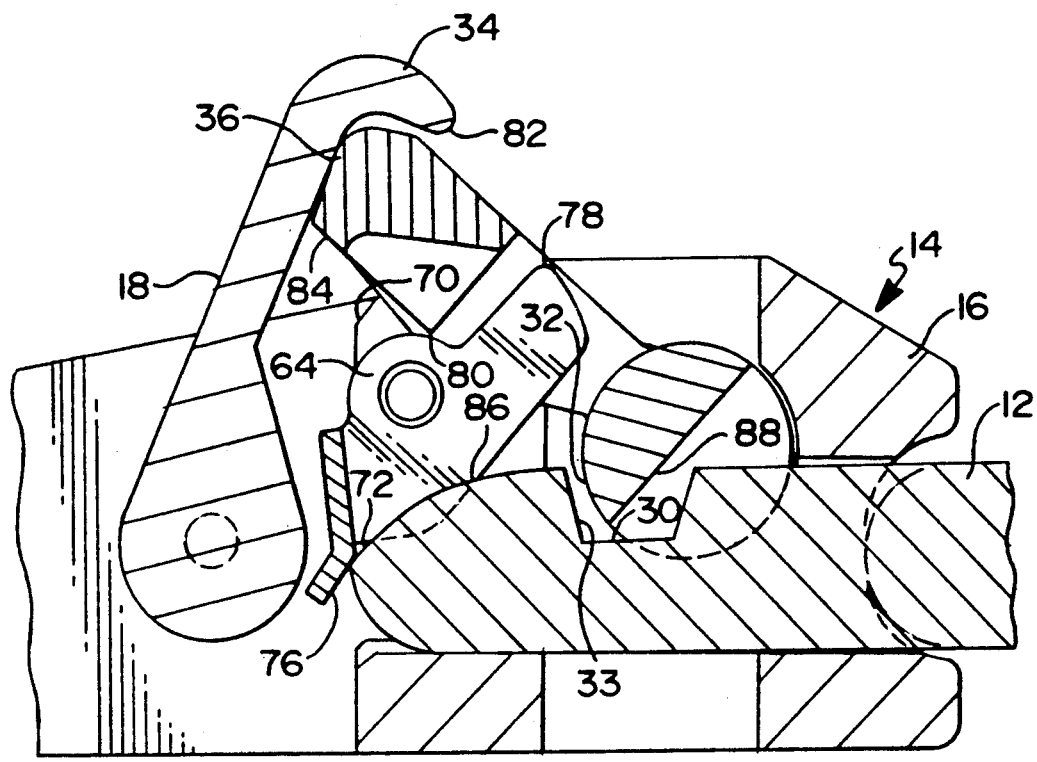
FIG. 5 is a view similar to FIG. 3, but showing the device in locked condition.
Figure 6:
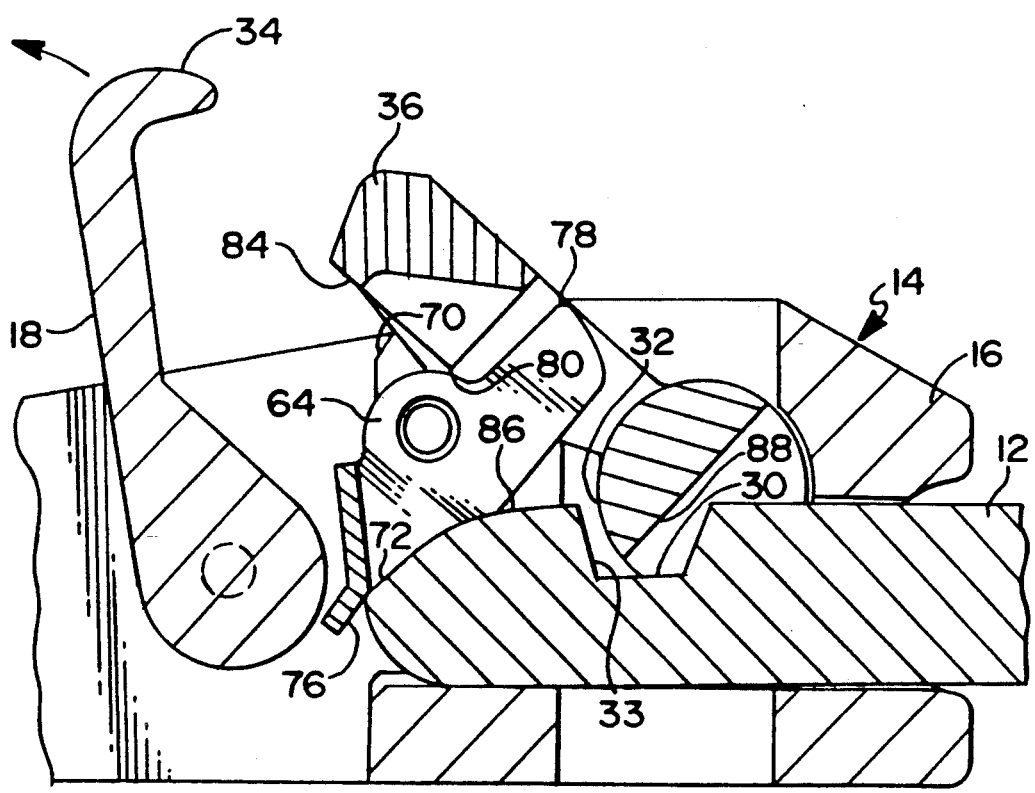
FIG. 6 is a view similar to FIG. 5, but showing the cover lever moved to a position uncovering the locking lever handle.

Each of the tangs 22, 24 includes a portion of a transverse locking notch 30 which receives a locking shoulder 32 mounted on locking lever 20. As shown in FIGS. 5 and 6, the engagement of surface 33 of notch 28 with shoulder 32 prevents removal of tangs 22, 24 from slots 26, 28 to prevent disconnection of connectors 12 and 14.

Figure 3:
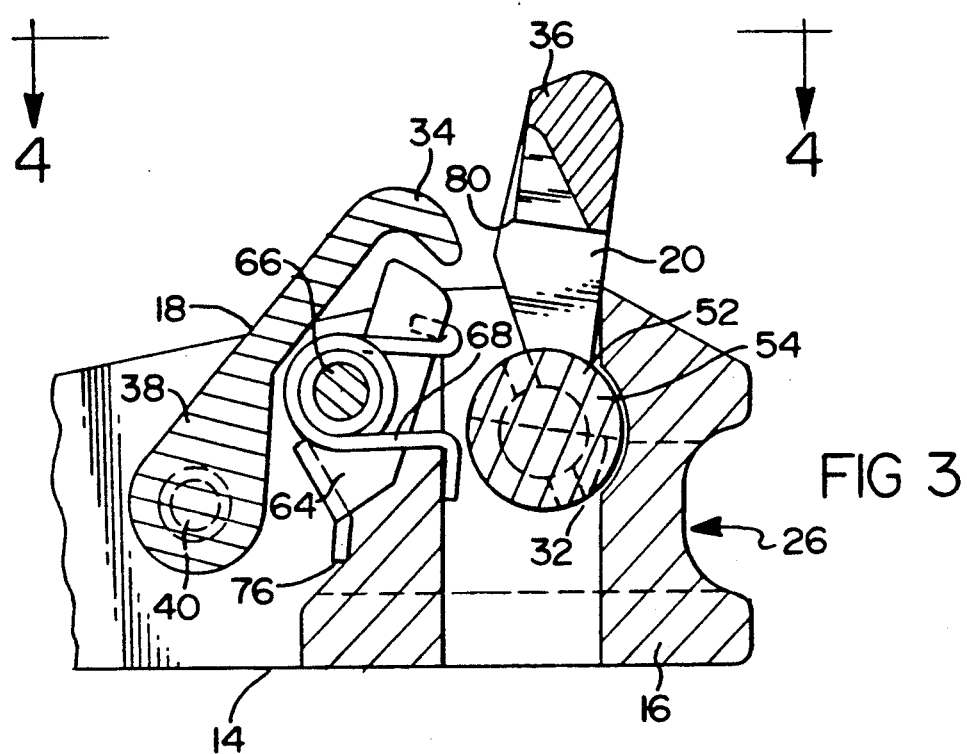
FIG. 3 is an enlarged sectional view of the device taken along lines 3—3 of FIG. 1 and showing the cover lever in spring-biased closed position and the locking lever handle in release position.
Figure 4:
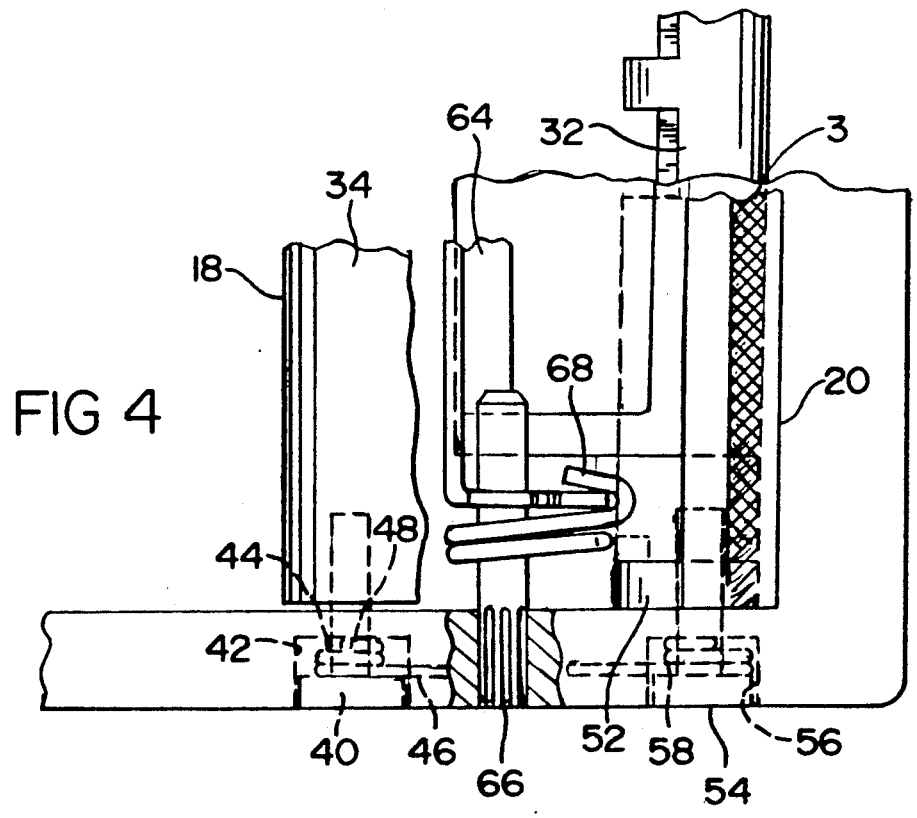
FIG. 4 is a partial sectional view taken along lines 4—4 of FIG. 3, partially broken away to show the details of construction.

Referring now to FIGS. 3, 4 and 5, cover lever 18 includes a handle portion 34 that overlies, or covers, a handle portion 36 of locking lever 20 in the FIG. 5 locked position. Cover lever 18 further includes a shank portion 38 that mounts pivot pins 40 that are journaled in apertures 42. A spring 44 embraces pins 40 and engages housing 16 at 46 and lever 18 at 48 to bias lever 18 to its covering position shown in FIG. 5. Cover lever 18 may be grasped by handle 34 and rotated against the bias of spring 44 from the covering position of FIG. 5 to the position of FIG. 6 to uncover handle 36.

Locking lever 20 includes a pair of bosses 52 that mount pivot pins 54 which are received in housing apertures 56 to enable pivotal movement of lever 20 relative to housing 16. A spring 58 extends between housing 16 and lever 20 to bias the lever to the locking position of FIG. 6. Once the cover lever 18 has been moved to the FIG. 6 position, handle 36 may be grasped to move lever 20 to its unlocking position shown in FIG. 3. This action rotates locking shoulder 32 out of locking notch 30, freeing locking tangs 22, 24 for removal through slots 26, 28 to separate connector 12 from connector 14.

Housing 16 mounts a blocking pawl 64 (FIG. 2) that is pivoted on pins 66, as shown in FIG. 4. A spring 68 biases pawl 64 to the blocking position shown in FIGS. 3, 7 and 8. As seen in FIG. 36, when locking lever 20 fully opened, this seemingly frees cover lever 18 for full closing movement, well beyond its covering position. However, such movement is inhibited by contact of the body of lever 18 with a shoulder 70 on housing 16 (see FIGS. 5 and 6), thus preventing interference with subsequent movement by locking lever 20.

Figure 7:
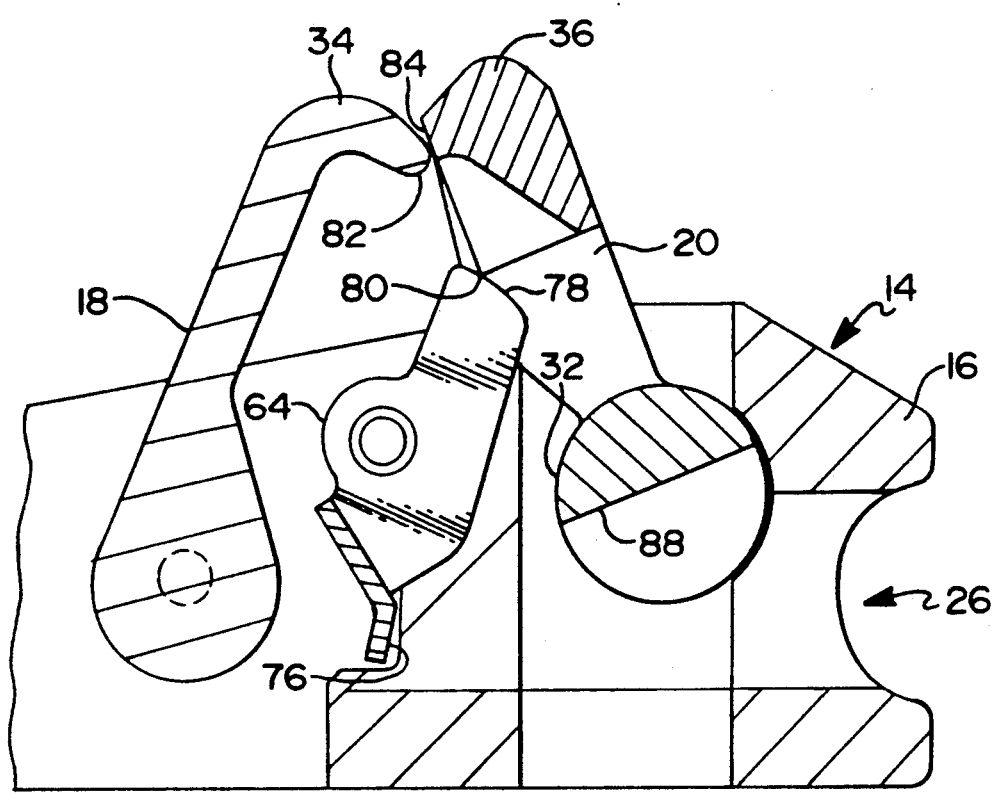
FIG. 7 is a view similar to FIG. 6, but showing the male connector removed after movement of the locking lever to unlocking position, with return movement of the locking lever to locking position blocked by movement of the pawl to blocking position.

When the male connector is removed, as in FIG. 7, spring 68 rotates pawl 64 to the illustrated position in which a blocking projection 78 on pawl 64 is engaged by a blocking abutment 80 on locking lever 20 upon release of the locking lever. This prevents locking lever 20 from moving to the locking position. Also, the nose 82 of cover lever handle 34 engages a barrier surface 84 on locking lever 20 to move cover lever to the FIG. 7 position out of engagement with housing shoulder 70.

As a consequence, both levers are maintained in the raised positions of FIG. 7 to provide a visual indication that the connecting device 10 is in release condition. Since no manual manipulation of the levers can change this orientation, due to the blocking action of blocking pawl 64, no false or artificial latching condition signal can be given.

Figure 8:
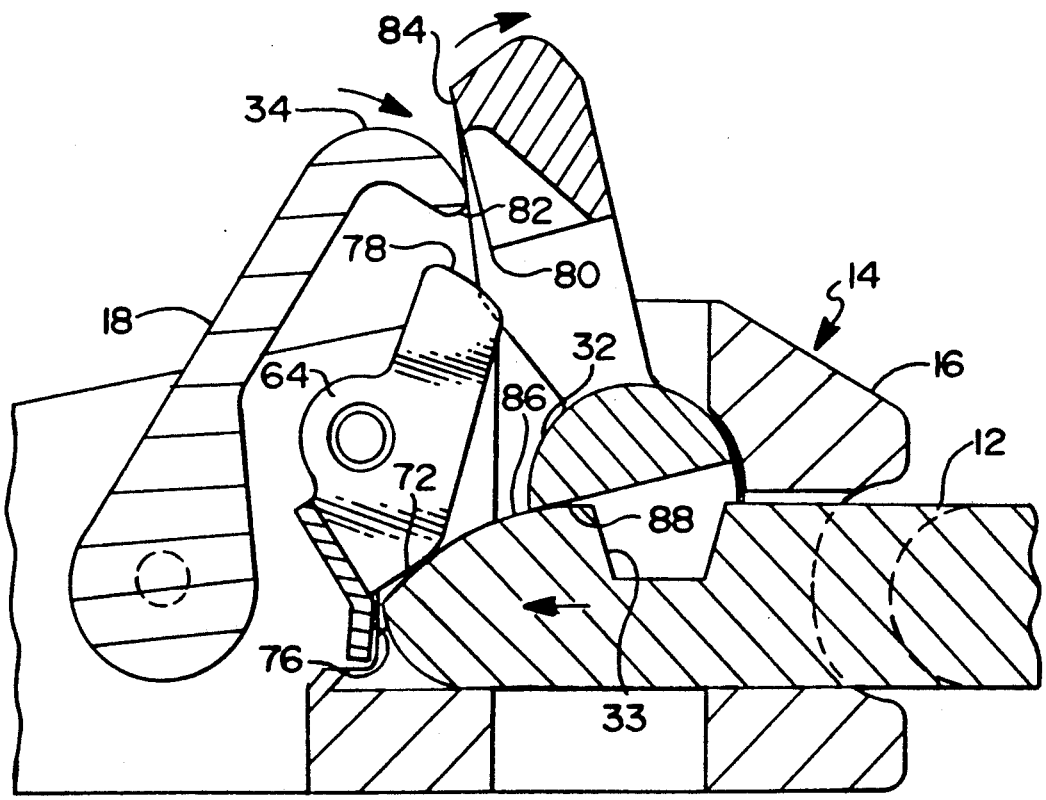
FIG. 8 is a view similar to FIG. 7, but showing the male connector partially inserted to move the locking lever off the pawl.
Figure 9:
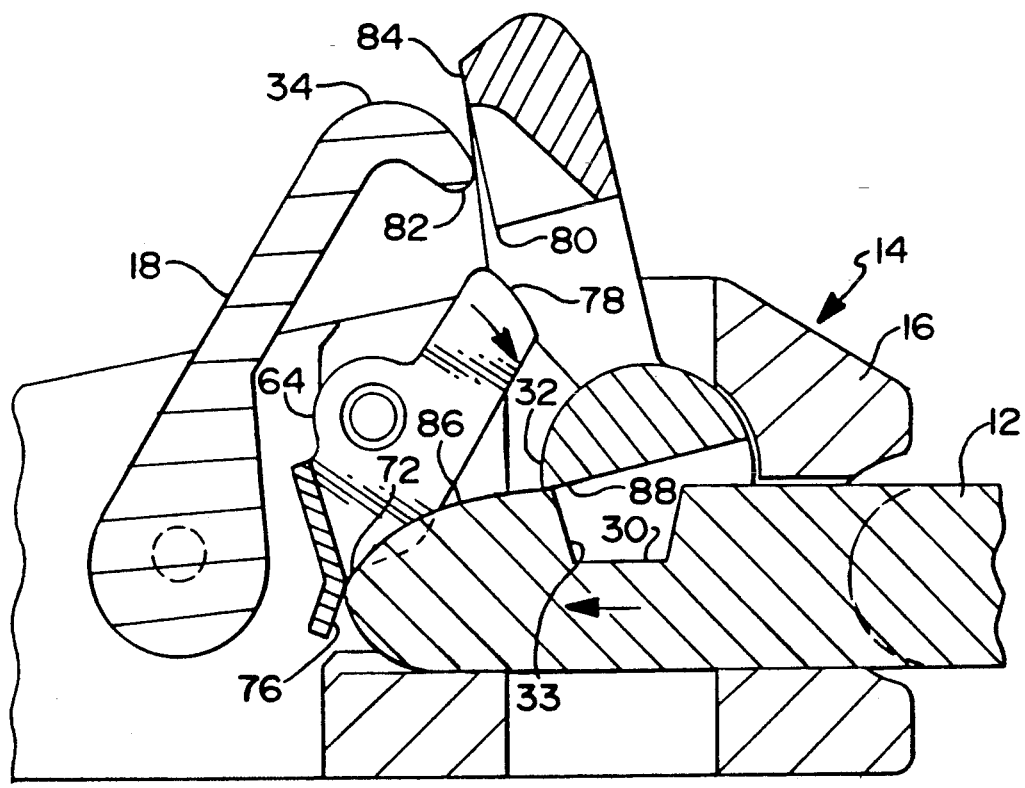
FIG. 9 is a view similar to FIG. 8, but showing the male member further inserted to begin moving the pawl out of unblocking position, enabling both levers to return to the FIG. 5 locked position.

To latch male connector 12 to female connector 14, connector tangs 22, 24 are inserted into slots 26, 28, whereupon upper cam surfaces 86 on tangs 22, 24 will engage a surface 88 on locking shoulder 32 to rotate locking lever 20 slightly to lift abutment 80 off of projection 78, as shown in FIG. 8. Pawl 64 is maintained in blocking position by the bias of spring 68. Further inward movement of tangs 22, 24 causes tang noses 72 to engage pawl surface 76 and force the pawl toward its unblocking position, as shown in FIG. 9.

Final movement of tangs 20, 22 enables cam surfaces 86 to clear surface 88, enabling spring 58 to move locking lever 20 toward locked position. This causes cam surface 84 and then upper lever surface 88 to cam past cover lever nose 82 and moves locking shoulder 32 into notch 30. As handle 36 passes nose 82, cover lever 18 will snap to its position covering handle 36, under the force of spring 44, with an audible "click". This signals that the connectors are locked together. No manual manipulation can enable both levers to assume the FIG. 5 position unless locking shoulder 32 has entered notch 30 to positively lock male connector 12 to female connector 14.

I claim:

1. A parachute canopy strap connecting device, comprising
    a male strap connector having a locking tang including a locking notch,
    a female strap connector having a housing including a slot for receiving the tang for insertion to a locking position,
    a locking lever having a handle mounted on the housing and including a lock shoulder movable into and out of the slot as the locking lever is moved between extreme lock and unlock positions,
    biasing means biasing the locking lever to lock position,
    a manually-operated cover lever independent of the locking lever pivotally mounted on the housing for movement between a first position covering and overlying the locking lever handle to provide a barrier to movement thereof which prevents access thereto and manual operation thereof and a second position uncovering the locking lever handle to enable access thereto and manual operation thereof,
    second biasing means biasing the cover lever to the first covering position, and
    a blocking pawl mounted on the housing and having a normal biased position blocking movement of the locking lever from unlock to lock position sand having a contact surface engageable by the locking tang upon insertion to locking position to move the pawl to an unblocking position enabling movement of the locking lever to locking position to move the lock shoulder into the notch to lock the male strap connector to the housing.

2. The connecting device of claim 1, wherein the locking lever includes a barrier surface engageable by the cover lever, upon sequential movement of the cover lever to uncovering position and movement of the locking lever to unlocking position, the prevent movement of the cover lever to cover position, until movement of the pawl to unblock position, by insertion of the locking tang to locking position, enables movement of the locking lever to locking position to disengage the blocking surface from the cover lever, which can then move to cover position.

3. The connecting device of claim 2, wherein the locking lever has a blocking abutment and the pawl has a blocking projection engageable therewith to block movement of the locking lever to locking position, the tang engaging the locking shoulder upon insertion to move the abutment off the projection to facilitate subsequent movement of the pawl to unblocking position by the tang.

4. The connecting device of claim 3, including a shoulder on the housing engageable with the cover lever in locking lever unlocking position to limit movement of the cover lever beyond covering position.

5. A connecting device comprising
    a male connector having a locking tang including a locking surface,
    a female connector having slot for receiving the tang for insertion to locking position,
    a locking lever having a handle portion and including a locking shoulder pivotally mounted on the female connector for movement between an unlock position and a lock position in which the locking shoulder can engage the locking surface to prevent removal of the male connector from the female connector,
    first biasing means biasing the locking lever to lock position,
    a blocking pawl pivotally mounted on the female connector for movement between blocking and unblocking positions,
    second biasing means biasing the pawl to blocking position upon movement of the locking lever to unlock position and removal of the male connector from the female connector,
    a cover lever pivotally mounted on the female connector independent of the locking lever for movement between a first covering position covering and overlying the handle portion of the locking lever and a second position uncovering said handle portion,
    third biasing means biasing the cover lever to the first covering position, and
    a barrier surface on the locking lever preventing movement of the cover lever to the first covering position when the locking lever is in unlock position,
    wherein the locking tang moves the pawl out of blocking position upon tang insertion to enable movement of the locking lever to lock position.

6. The connecting device of claim 5, including a shoulder on the housing engageable with the cover lever in locking lever unlocking position to limit movement of the cover lever beyond covering position.

* * * * *